(12) United States Patent
Zhou (10) Patent No.: US 7,854,074 B2
(45) Date of Patent: Dec. 21, 2010

(54) MAGNETIC END HOOK FOR TAPE MEASURE, MANUFACTURE METHOD AND APPLICATION THEREOF

(76) Inventor: Xiaogang Zhou, Ningbo Hongdi Measuring Tape Co. Ltd., CW4 Fareast Industrial City, Yuyao, Zhejiang (CN) 315400

( * ) Notice: Subject to any disclaimer, the term of this patent is extended or adjusted under 35 U.S.C. 154(b) by 129 days.

(21) Appl. No.: 12/295,437

(22) PCT Filed: Feb. 13, 2007

(86) PCT No.: PCT/CN2007/000493

§ 371 (c)(1),
(2), (4) Date: Sep. 30, 2008

(87) PCT Pub. No.: WO2008/080269

PCT Pub. Date: Jul. 10, 2008

(65) Prior Publication Data

US 2009/0288307 A1   Nov. 26, 2009

(30) Foreign Application Priority Data

Dec. 29, 2006   (CN)   .................... 2006 1 0155663

(51) Int. Cl.
*G01B 3/10* (2006.01)
(52) U.S. Cl. .................. 33/758; 33/770; 33/DIG. 1
(58) Field of Classification Search .............. 33/758, 33/759, 760, 768, 770, DIG. 1
See application file for complete search history.

(56) References Cited

U.S. PATENT DOCUMENTS

| | | | | |
|---|---|---|---|---|
| 4,827,622 A | * | 5/1989 | Makar | 33/770 |
| 6,073,983 A | * | 6/2000 | Schroeder | 294/65.5 |
| 6,370,790 B1 | * | 4/2002 | Stenger | 33/758 |
| 6,427,358 B1 | * | 8/2002 | LeBon et al. | 33/758 |
| 6,442,863 B1 | * | 9/2002 | Poineau et al. | 33/758 |
| 6,663,153 B2 | * | 12/2003 | Brunson | 294/65.5 |
| 6,678,967 B1 | * | 1/2004 | Jueneman | 33/758 |
| 6,874,245 B2 | * | 4/2005 | Liu | 33/758 |
| 7,240,439 B2 | * | 7/2007 | Critelli et al. | 33/758 |
| 7,475,492 B1 | * | 1/2009 | Huang | 33/758 |

(Continued)

FOREIGN PATENT DOCUMENTS

CN   ZL95233982.X   2/1997

(Continued)

*Primary Examiner*—Christopher W Fulton
(74) *Attorney, Agent, or Firm*—Global IP Services; Tianhua Gu (57) ABSTRACT

A magnetic end hook on tape measure, comprises a magnet (3) and a main body (1) of the end hook which includes a horizontal portion (11) jointed with a tape blade, a vertical portion (12) having a front surface (12b), a rear surface (12a) and at least one hole (121) for setting said magnet (3); wherein the magnetic end hook further comprising an gasket (2), said gasket has an adapted hole or groove (24) for receiving said magnet (3). A method of manufacture and an application are also described. Compared with the prior art, in this invention, the gasket, additionally set between the hole of the end hook and the magnet on the magnetic end hook, is resilient and can adjust the preferred distance between the magnet and the inner wall of the hole. Therefore, the magnet is mounted more firmly and the probability of falling or breaking is reduced.

8 Claims, 9 Drawing Sheets

U.S. PATENT DOCUMENTS

2006/0283036 A1* 12/2006 Huang .................. 33/758
2010/0050456 A1* 3/2010 Huang .................. 33/770

FOREIGN PATENT DOCUMENTS

| CN | ZL02284783.X | 10/2003 |
| CN | ZL03203658.2 | 4/2004 |
| CN | ZL200520061608.1 | 9/2006 |
| EP | 1247061 B1 | 9/2002 |

* cited by examiner

MAGNETIC END HOOK FOR TAPE MEASURE, MANUFACTURE METHOD AND APPLICATION THEREOF

FIELD OF THE INVENTION

The present invention relates to the field of tape measure and its manufacture, in particular, to a magnetic end hook for tape measure and method of manufacture therefore, and the tape measure with the magnetic end hook.

DESCRIPTION OF THE PRIOR ART

Tape measure is an usual tool to measure a long distance which is generally above 20 cm. It generally includes a housing, a coiled tape blade mounted in the housing, and the end of the tape blade is bended, which is called as end hook. The end hook has three functions: first of all, it can be blocked at the opening of the housing to prevent the tape blade completely retracting into the housing; Secondly, it is convenient for user to pull the tape blade out by fingers; Thirdly, the start position of the measurement can be hooked by the end hook so that even one person can do the measurement.

However, not all of the start position of the measurement can be hooked by the end hook, for example, the start position is planar (such as a wall) or columnar (such as a pipe), but if the start position is ferromagnetism (also called as magnetizer) or has something ferromagnetic on it, a magnet can be mounted on the end hook and then the end hook can be attracted on the magnetizer, so the tape blade can be pulled out and it will again be possible for single person using. Additionally the measure tape can also be used as a retractable ferromagnetic picker, we can pick up the little ferromagnetic objects such as screws, nails, clips and keys that dropped on the floor, in a corner or in a gap.

There are many technical solutions similar as the above mentioned end hook which has a magnet, such as the following Chinese Utility Model Patents:

CN2247794Y, titled "A Steel Tape Measure for Miner" whose patent number is ZL95233982.X;

CN2580397Y, titled "An Active Hook on Tape Measure and A Tape Measure with That Hook" whose patent number is ZL02284788.X;

CN2610304Y, titled "A Tape Measure with magnet" whose patent number is ZL03203658.2; CN2814321Y, titled "Improved End Hook of Tape Measure" whose patent number is ZL200520061608.1; and so on.

In these solutions, the magnet is mounted on the end hook of the tape measure by riveting, adhering or adhering after inserting into the groove on the end hook. However, the existing problems in those solutions are as follows: Firstly, most of the magnets with strong magnetism are manufactured by powder metallurgy such as Nd—Fe—B which is not suitable for riveting; Secondly, the magnet mounted on the end hook by adhering is not firm enough, the magnet will probably loose from the end hook after long time using; Thirdly, the magnet is difficulty to be mounted exactly by riveting or adhering, and it will change the thickness of the end hook and effect the exactness of measurement.

Furthermore, the European Patent EP1247061B1 discloses a tape measure which comprises a tape; an end hook joined to an end of the tape, the end hook having an attachment end and a hook end, the attachment end being joined to the tape, the hook end having a first surface (that is the front surface) and a second surface (that is the rear surface); a magnet friction fit within the end hook, the magnet being approximately the same thickness as the end hook and the magnet extending through the end hook such that the magnet is part of the first surface and part of the second surface, and the magnet being exposed at the first surface and at the second surface, for attraction to a material to be measured.

The same applicant also has the American Patent U.S. Pat. No. 6,678,967B1 which discloses the same tape measure with magnetic end hook, but it is a bit different in magnet mounting. The tape measure comprises a housing joined to a tape; an end hook joined to an end of the tape, the end hook having an attachment end and a hook end, the attachment end being joined to the tape, the hook end having a hooking surface (that is the front surface) and a butting surface (that is the rear surface); and at least one magnet compression fitted within the end hook, the magnet extending through the end hook such that the magnet is part of the hooking surface and part of the butting surface, and the magnet being exposed to a material to be measured at the hooking surface and at the butting surface.

These two above solutions ensure the exactness of the magnet mounting in these three way: restricting the same thickness of the end hook and the magnet, mounting the magnet in the corresponding hole on the end hook by friction fitting or compression fitting, and ensuring the front surface and the rear surface of the magnet separately being part of the front surface and part of the rear surface of the end hook.

But these two above solutions still have some problems as below:

Firstly, no matter friction adapted or compression fitting, both require certain rigidity of the magnet, it is not suitable for the magnet with strong magnetism produced by powder metallurgy such as Nd—F—B, since the magnet will probably crash during the process of manufacture.

Secondly, even if to the magnet with enough rigidity, no matter friction fitting or compression fitting, the joint area between the magnet and the end hook is still small limited by the thickness of the end hook, and the magnet will probably fall under the strong outside force such as crash or squeeze.

Thirdly, it is difficult to ensure the front surface and the rear surface of the magnet separately being part of the front surface and the rear surface of the end hook during the process of manufacture. Even if it can be done, the efficiency of manufacture will be low.

SUMMARY OF THE INVENTION

It is an object of the present invention to provide a magnetic end hook for tape measure whose components can be set firmly and are easy to assemble, and furthermore to reduce the probability of breaking the magnet.

It is another object of the present invention to provide a magnetic end hook which can make it easy to mount the magnet exactly.

It is still another object of the present invention to provide a method for manufacturing said magnetic end hook for tape measure.

It is still another object of the present invention to provide a tape measure with said magnetic end hook.

For achieving the above object, the magnetic end hook for tape measure comprises a magnet;

a main body of end hook, which includes a horizontal portion jointed with a tape blade, a vertical portion having a front surface, a rear surface and at least one hole for setting said magnet;

wherein the magnetic end hook further comprising a gasket mounted suitably in said hole, said gasket has an adapted hole or groove for receiving said magnet.

The magnet is exposed at the front surface of the gasket and is coplanar with or protrusive from said front surface. Or the magnet is sunk in said adapted hole or groove of said gasket and is encircled with the edge of the adapted hole or groove. And the magnet can also be completely embedded and enwrapped in the gasket.

The gasket comprises at least one inserting portion for inserting into the adapted hole on the end hook and one extending portion projecting outward for leaning on the surface of the vertical portion.

The vertical portion has a pair of holes and the gasket has a pair of adapted holes or grooves correspondingly. Of course, the vertical portion can only have one single hole, and the gasket has one single adapted hole or groove correspondingly. The quantity of the hole or adapted hole/groove can be selected freely, but two is better.

And the gasket has a strip-shaped bulge between the adapted holes or grooves and said vertical portion has a strip-shaped hole correspondingly to receive and fix the strip-shaped bulge. This design makes the magnet joint with the end hook more firmly.

The hole has a ring-shaped rib on its inner wall and the gasket has a ring-shaped groove to receive the ring-shaped rib correspondingly. This design further makes the magnet joint with the end hook more firmly.

The gasket is a plastic-injection part, and is fixed on the vertical portion of the main body of the end hook through plastic injection with the magnet as a metal insert.

A method of manufacture of a magnetic end hook for tape measure of the present invention comprises the steps as below:

Step 1, fixing a mould on the plastic injection machine, the mould includes a top mould and a bottom mould, the top mould has a location hole for magnet near an injection port of the plastic injection machine, correspondingly the bottom mould has a location groove for a main body of an end hook;

Step 2, putting the magnet in the location hole of the top mould, and putting the main body of the end hook on the location groove;

Step 3, closing the mould, and then the plastic injection machine injecting plastic, making the main body of the end hook and the magnet to be a whole plastic part finally.

A tape measure with a magnetic end hook described above which joints with the end of tape blade of the tape measure, and the magnetic end hook comprises:

a magnet;

a main body of the end hook, which includes a horizontal portion jointed with the tape blade, a vertical portion including a front surface and a rear surface, and at least one hole for setting the magnet; and The magnetic end hook further comprising a gasket mounted suitably in said hole, the gasket has an adapted hole or groove to receive the magnet.

Compared with the prior art, in this invention, the gasket additionally set between the hole of the end hook and the magnet on the magnetic end hook is resilient and can adjust the preferred distance between the magnet and the inner wall of the hole. Therefore, the magnet is mounted more firmly and the probability of falling or breaking is reduced. Furthermore, the strip-shaped bulge on the gasket makes the magnet joint with the end hook more firmly. More importantly, the gasket and the magnet can be fixed on the vertical portion of the main body of the end hook together through plastic injection with the magnet as a metal insert. It not only greatly improves the efficiency of manufacture, but also ensures the exactness of assembly.

The method of manufacturing the magnetic end hook of the present invention, which using the plastic injection machine, makes the magnet and the end hook into one whole component. The method increases the daily output of the production, makes the assembly more firm, reduces the damage to the magnet, and raises the qualification rate. The method moreover rarely changes original structure of the end hook, and greatly improves the accuracy of measurement when the tape measure used.

DETAILED DESCRIPTION OF THE PREFERRED EMBODIMENT

Figure 1:
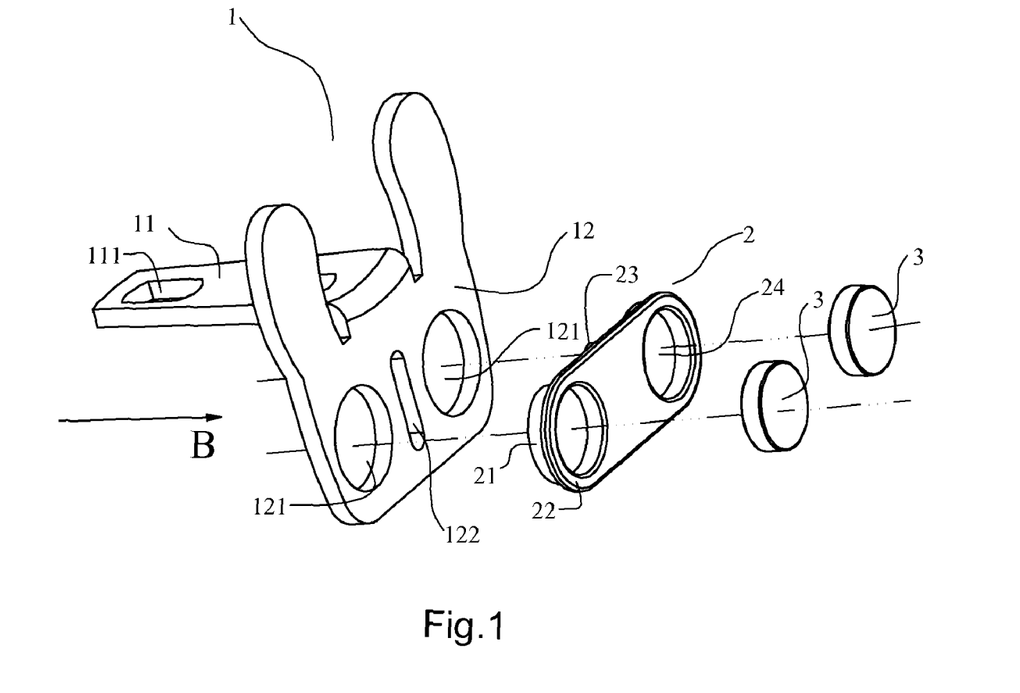
FIG. 1 is an exploded view of the first embodiment of the magnetic end hook of the present invention.
Figure 2:
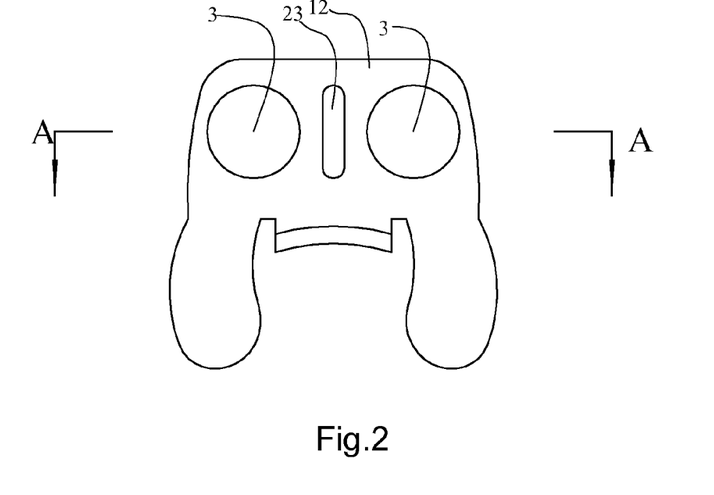
FIG. 2 is the elevation view of B way of FIG. 1.
Figure 3:
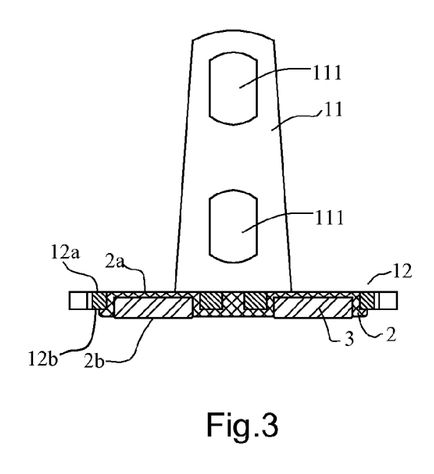
FIG. 3 is the sectional view of A-A way of FIG. 2.

To enable a further understanding of the innovative and technological content of the invention herein, refer to the detailed description of the invention and the accompanying drawings below:

FIGS. 1-3 show the first embodiment of the present invention.

In this embodiment, the magnetic end hook for tape measure comprises two magnets 3, a main body 1 of end hook and a gasket 2. The main body 1 of end hook comprises a horizontal portion 11 jointed with a tape blade and a vertical portion 12. The horizontal portion 11 has a pair of eyelets 111 for the end hook being mounted on the tape blade, and the vertical portion 12 has a pair of holes 121 for setting the magnets 3, furthermore, the vertical portion 12 includes a front surface 12b and a rear surface 12a. While, the magnets 3 are exposed and protrude from the front surface 2b of the gasket 2, and the magnets 3 are not exposed at the rear surface 2a of the gasket 2.

The gasket 2 comprises two inserting portions 21 which separately locate in the holes 121 on the end hook and two extending portions 22 projecting outward for leaning on the surface of the vertical portion 12. The gasket 2 has a strip-shaped bulge 23 between the two inserting portions 21 and the vertical portion 12 has a strip-shaped hole 122 to receive and fix the strip-shaped bulge 23 correspondingly, so the gasket 2 is mounted suitably in the holes 121. And the gasket 2 has a pair of grooves 24 to receive the magnets 3.

When assembling, the gasket 2 is a plastic-injection part, and is fixed on the vertical portion 12 of the main body 1 of the end hook through plastic injection with the magnets 3 as metal inserts. The gasket 2 and the magnets 3 can also be plastic-injected individually, and joint together through adhering or plastic injection afterward. In this embodiment, the magnets 3 can also be exposed to the rear surface 2a of the gasket 2. The gasket 2 can be made of normal plastic and it is resilient. The gasket 2 can consist of two separate parts made respectively corresponding to the pair of the holes 121, and each part has one said adapted groove 24, in this situation, said strip-shaped bulgy 23 can be omitted.

Figure 4:
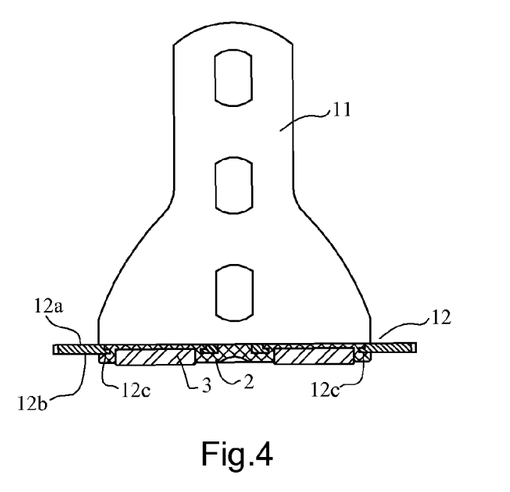
FIG. 4 is the sectional view of the second embodiment of the magnetic end hook of the present invention.

FIG. 4 shows the second embodiment of the present invention.

The difference of this embodiment compared with the first embodiment is that each hole 121 of the magnetic end hook has ring-shaped rib 12c on its inner wall, correspondingly, the gasket 2 has ring-shaped grooves to receive the ring-shaped ribs 12c respectively.

Figure 5:
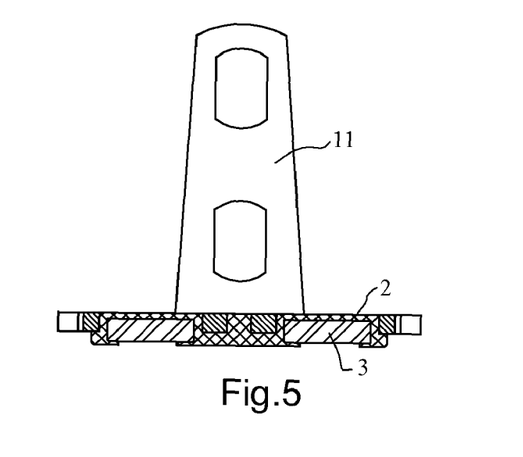
FIG. 5 is the sectional view of the third embodiment of the magnetic end hook of the present invention.

FIG. 5 shows the third embodiment of the present invention.

The difference of this embodiment compared with the first embodiment is that each magnet 3 is sunk in the adapted groove 24 of the gasket 2 and is encircled with the edge of the adapted groove 24.

Figure 6:
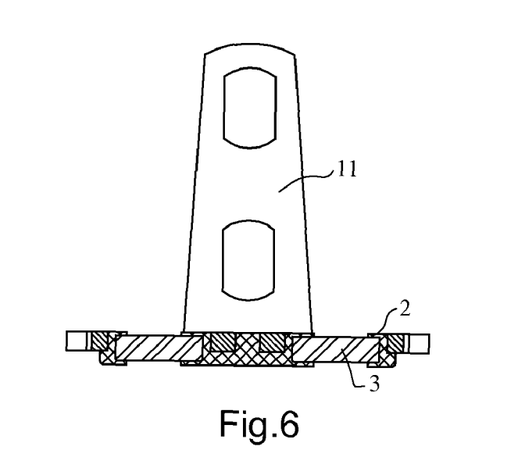
FIG. 6 is the sectional view of the fourth embodiment of the magnetic end hook of the present invention.

FIG. 6 shows the fourth embodiment of the present invention.

The difference of this embodiment compared with the first embodiment is that each magnet 3 is encircled by the edge of the front surface 2b and the rear surface 2a of the gasket 2.

Figure 7:
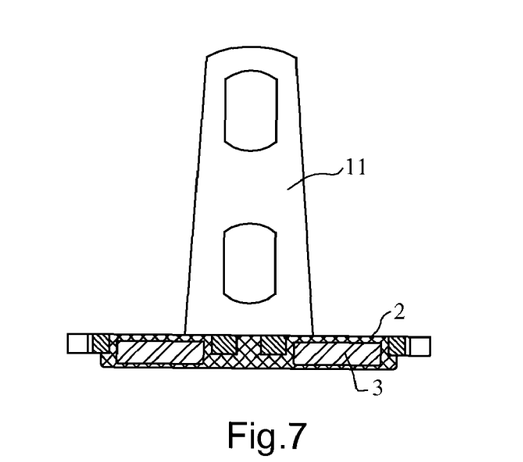
FIG. 7 is the sectional view of the fifth embodiment of the magnetic end hook of the present invention.
Figure 8:
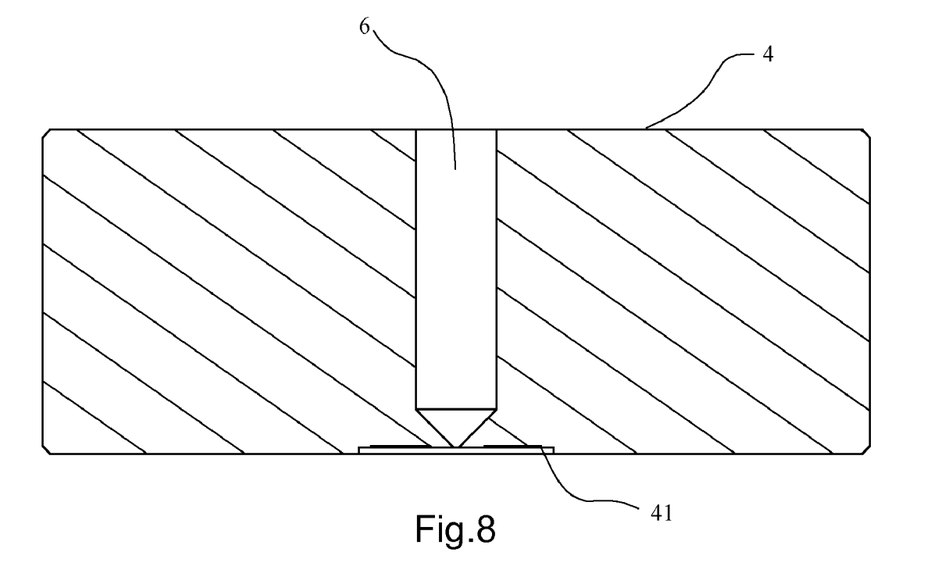
FIG. 8 is the sectional view of the top mould in the sixth embodiment of the method of manufacture of the magnetic end hook of the present invention.
Figure 9:
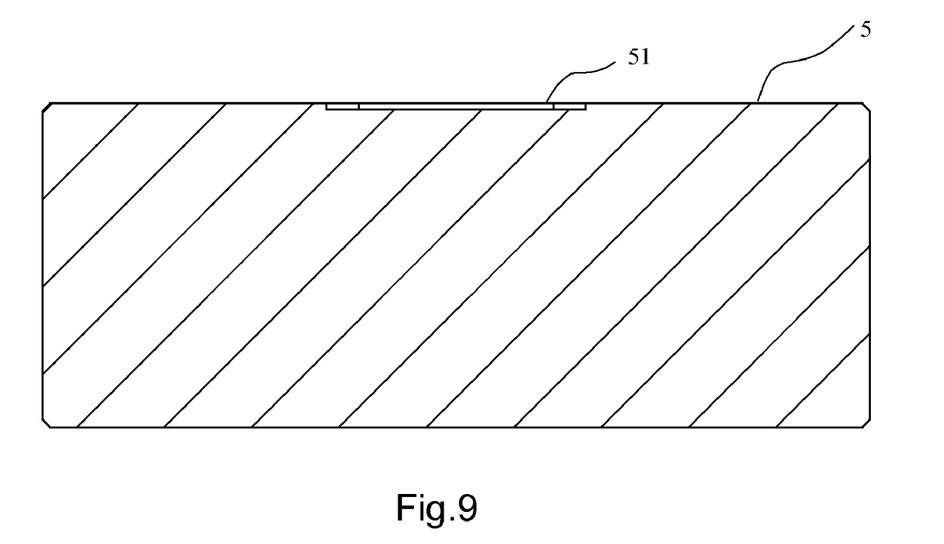
FIG. 9 is the sectional view of the bottom mould in the sixth embodiment of the method of manufacture of the magnetic end hook of the present invention.
Figure 10:
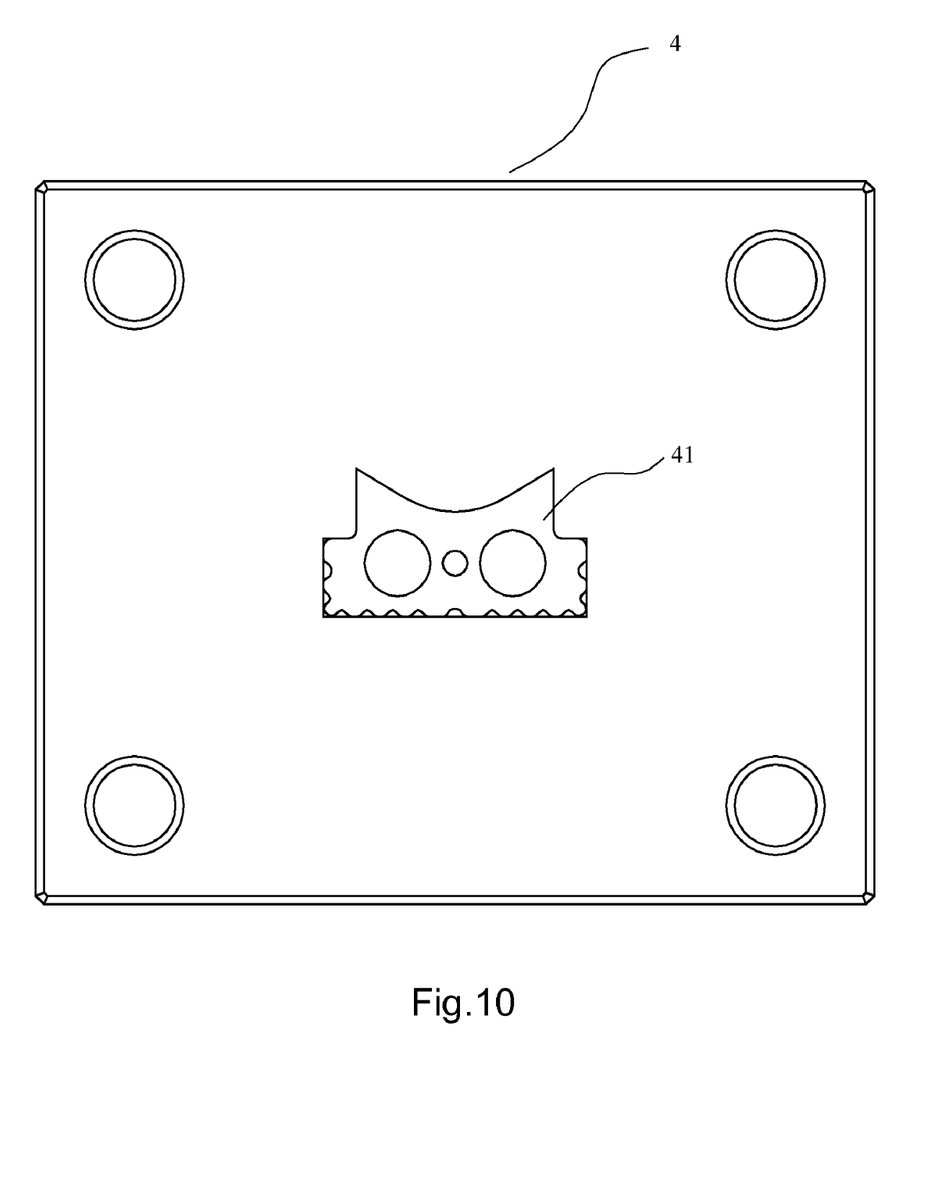
FIG. 10 is the bottom plan view of FIG. 8.
Figure 11:
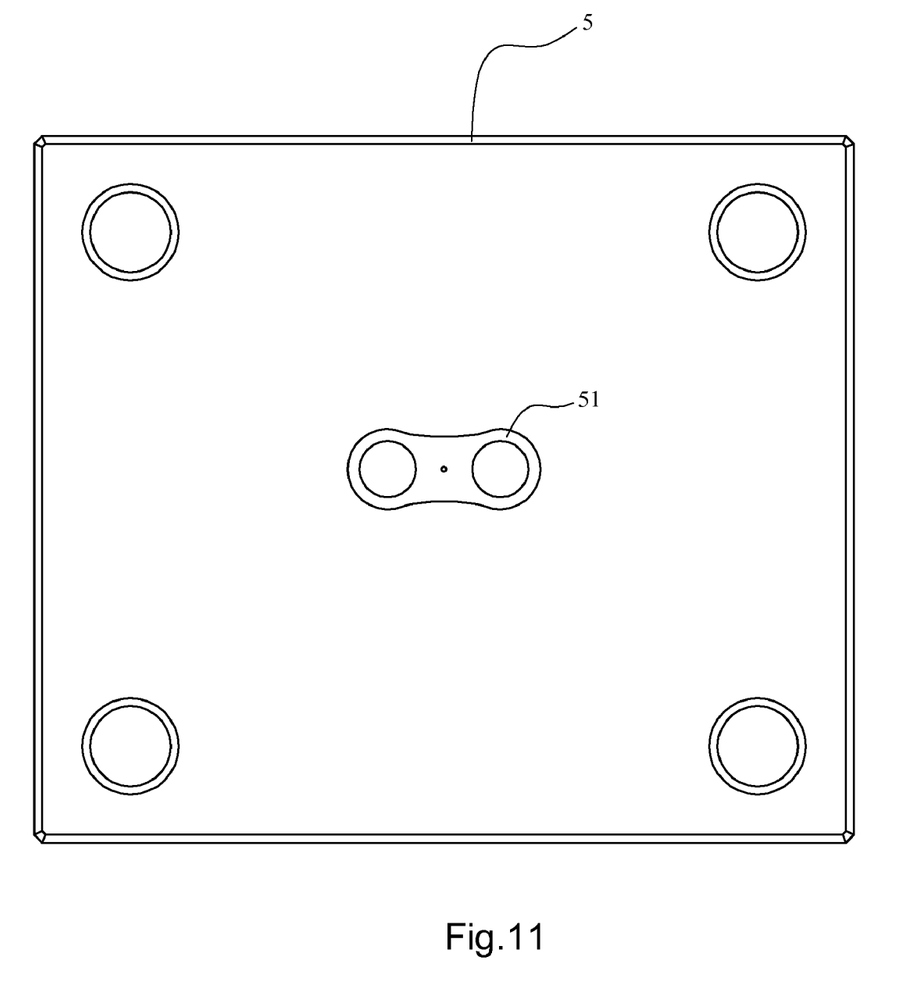
FIG. 11 is the top plan view of FIG. 9.

FIG. 7 shows the fifth embodiment of the present invention.

The difference of this embodiment compared with the first embodiment is that each magnet 3 is completely embedded in the space enwrapped by the front surface 2b and the rear surface 2a of the gasket 2.

FIGS. 8-14 show the sixth embodiment of the present invention.

Figure 12:
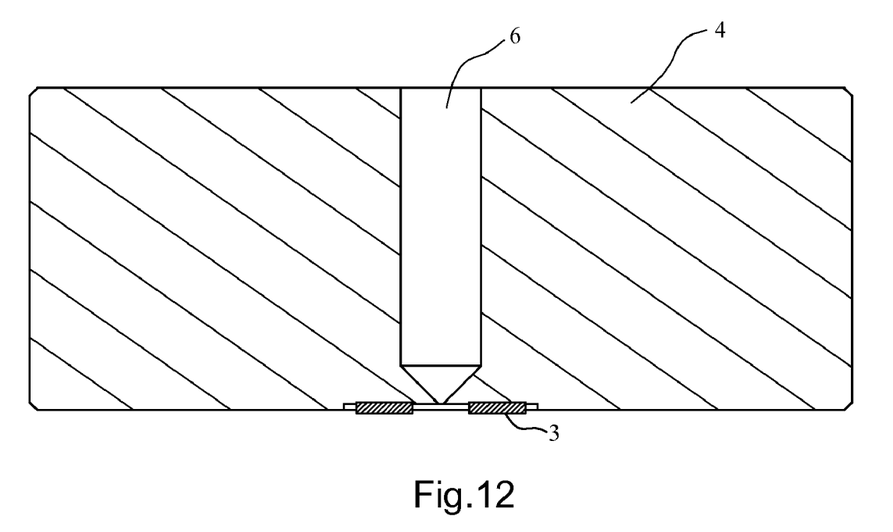
FIG. 12, FIG. 13 and FIG. 14 are the views of manufacture steps of the sixth embodiment of the method of manufacture of the magnetic end hook of the present invention.
Figure 13:
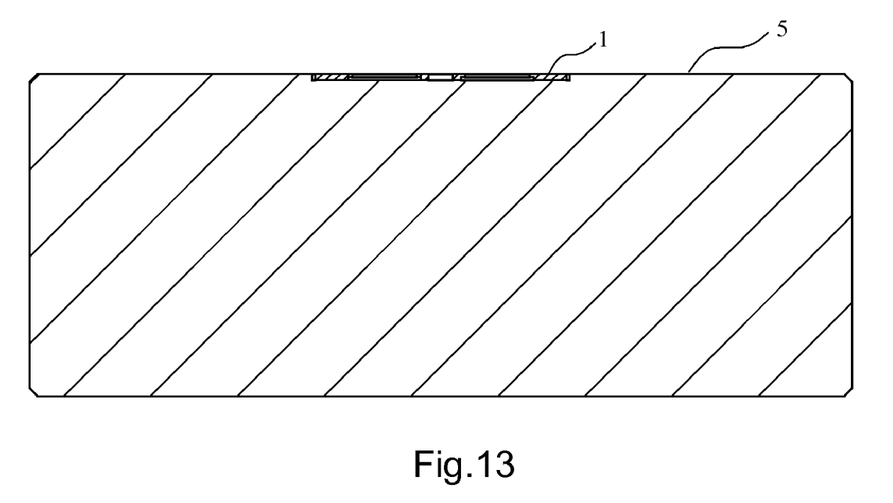
Figure 14:
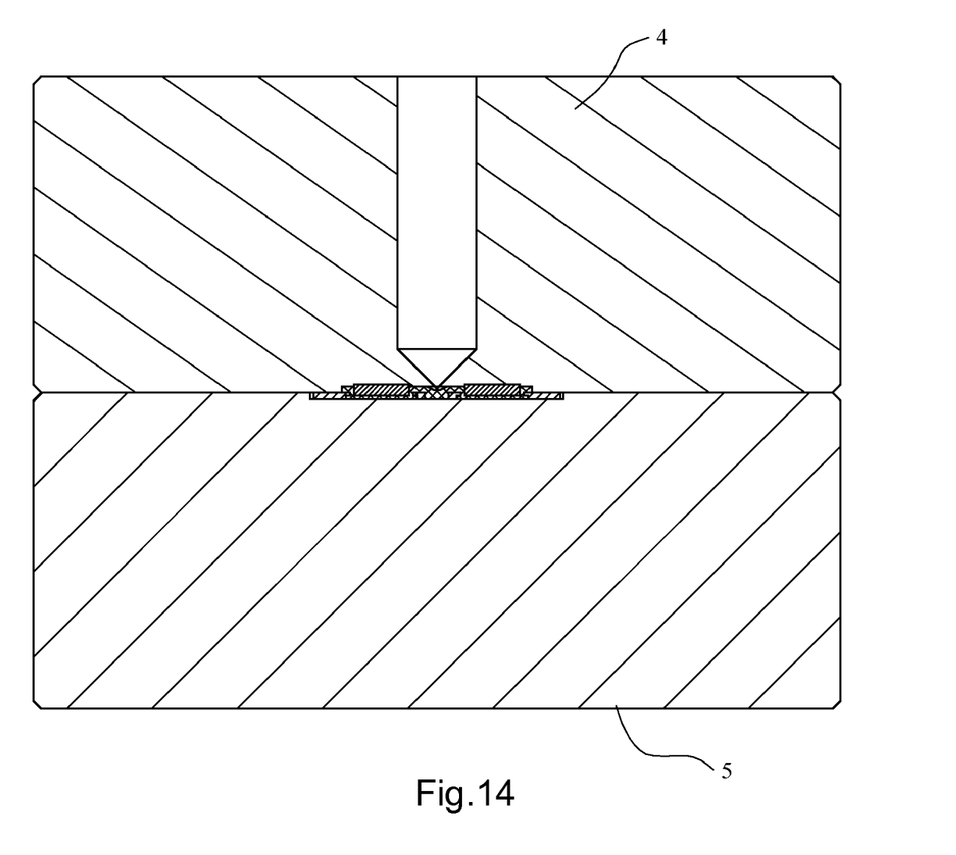

The method of manufacture of the magnetic end hook for tape measure, comprises the steps as below:

Step 1, fixing a mould on the plastic injection machine 6, the mould includes a top mould 4 and a bottom mould 5, and the top mould 4 has a location hole 41 for magnet near an injection port of the plastic injection machine 6 and the bottom mould 5 has a location groove 51 for a main body of an end hook correspondingly;

Step 2, putting the magnet 3 in the location hole 41 of the top mould 4, and putting the main body 1 of the end hook on the location groove 51;

Step 3, closing the moulds, and then the plastic injection machine 6 injecting plastic, making the main body 1 of the end hook and the magnets 3 be a whole plastic part finally.

Figure 15:
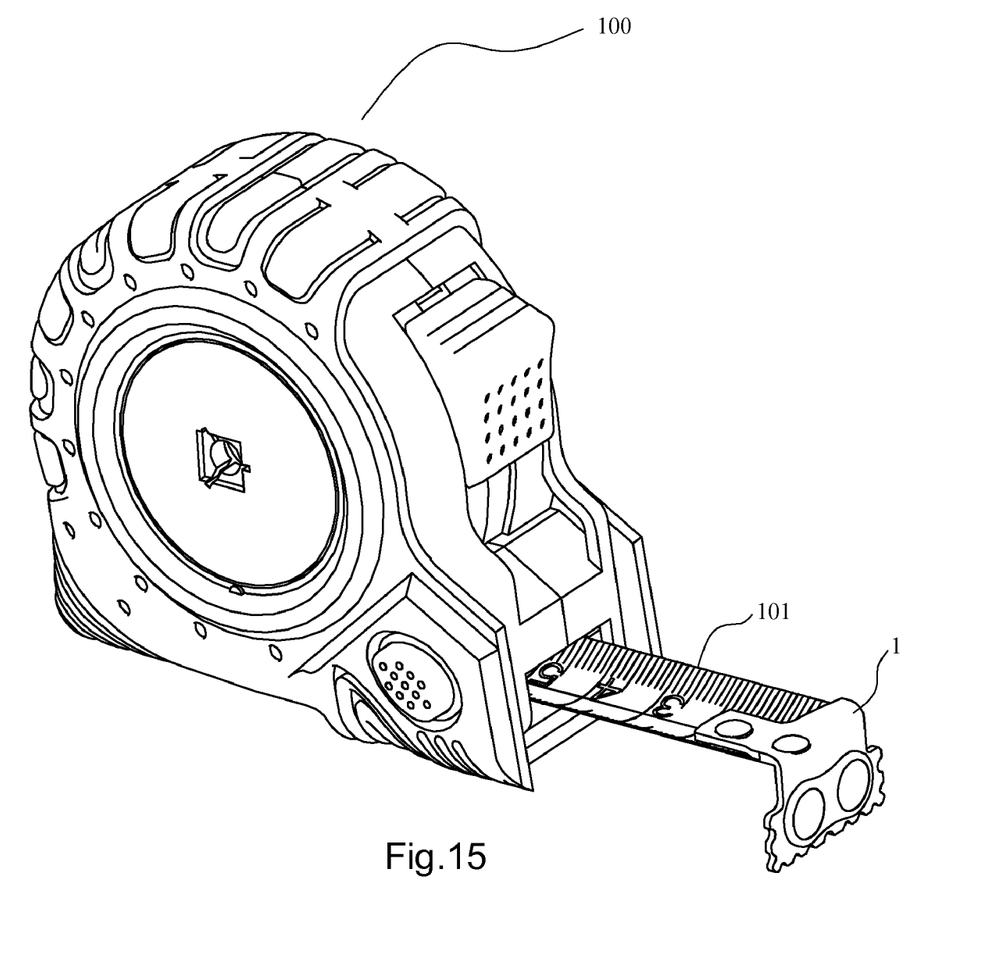
FIG. 15 is a perspective view of the tape measure after manufacturing according to the method of the sixth embodiment.

FIG. 15 shows a complete manufactured tape measure. The tape measure 100, the tape blade 101 and the main body 1 which is mounted with the magnets 3 and joints with the tape blade 101, can all be seen in FIG. 15.

What is claimed is:

1. A magnetic end hook for tape measure, comprising:
  a magnet (3);
  a main body (1) of end hook, which includes a horizontal portion (11) jointed with a tape blade a vertical portion (12) having a front surface (12b), a rear surface (12a) and at least one hole (121) for setting said magnet (3);
  wherein the magnetic end hook further comprising a gasket (2) mounted suitably in said hole (121), said gasket has an adapted hole or groove (24) for receiving said magnet (3);
  said vertical portion (12) having a pair of holes (121) and said gasket (2) having a pair of adapted holes or grooves (24) correspondingly, said gasket (2) having a strip-shaped bulge (23) between said adapted holes or grooves (24) and said vertical portion (12) having a strip-shaped hole (122) correspondingly to receive and fix said strip-shaped bulge (23).

2. The magnetic end hook for tape measure of claim 1, wherein said magnet (3) is exposed at the front surface of said gasket (2) and is coplanar with or protrusive from said front surface.

3. The magnetic end hook for tape measure of claim 1, wherein said magnet (3) is sunk in said adapted hole or groove (24) of said gasket (2) and is encircled with the edge of said adapted hole or groove (24).

4. The magnetic end hook for tape measure of claim 1, wherein said magnet (3) is completely embedded and enwrapped in said gasket (2).

5. The magnetic end hook for tape measure of anyone of claim 1 to claim 4, wherein said gasket (2) comprises at least one inserting portion (21) for inserting into said hole (121) on the end hook and one extending portion projecting outward for leaning on the surface of said vertical portion (12).

6. The magnetic end hook for tape measure of anyone of claim 1 to claim 4, wherein said hole (121) has a ring-shaped rib (12c) on its inner wall, and said gasket (2) has a ring-shaped groove to receive said ring-shaped rib (12c) correspondingly.

7. The magnetic end hook for tape measure of anyone of claim 1 to claim 4, wherein said gasket (2) is a plastic-injection part and is fixed on said vertical portion (12) of the main body (1) of the end hook through plastic injection with said magnet (3) as a metal insert.

8. A tape measure with a magnetic end hook, wherein the end of tape blade of the tape measure comprises a magnetic end hook that comprises:
  a magnet (3);
  a main body (1) of the end hook, which includes a horizontal portion (11) jointed with the tape blade, a vertical portion (12) including a front surface (12b), a rear surface (12a) and at least one hole (121) for providing a suited location for setting said magnet (3); and
  the magnetic end hook further comprising a gasket (2) mounted suitably in said hole (121), the gasket (2) has an adapted hole or a groove (24) to receive said magnet (3);
  said vertical portion (12) having a pair of holes (121) and said gasket (2) having a pair of adapted holes or grooves (24) correspondingly, said gasket (2) having a strip-shaped bulge (23) between said adapted holes or grooves (24) and said vertical portion (12) having a strip-shaped hole (122) correspondingly to receive and fix said strip-shaped bulge (23).

* * * * *